(12) United States Patent
Li et al.

(10) Patent No.: US 6,861,788 B2
(45) Date of Patent: Mar. 1, 2005

(54) SWITCHABLE DISPLAY/MIRROR METHOD AND APPARATUS

(75) Inventors: Zili Li, Barrington, IL (US); Zane Coleman, Chicago, IL (US)

(73) Assignee: Motorola, Inc., Schaumburg, IL (US)

( * ) Notice: Subject to any disclaimer, the term of this patent is extended or adjusted under 35 U.S.C. 154(b) by 78 days.

(21) Appl. No.: 10/453,405

(22) Filed: Jun. 3, 2003

(65) Prior Publication Data

US 2004/0245902 A1 Dec. 9, 2004

(51) Int. Cl.[7] .................................................. H01J 5/16
(52) U.S. Cl. ........................ 313/112; 313/113; 313/506
(58) Field of Search ................................ 313/110, 113, 313/498, 506

(56) References Cited

U.S. PATENT DOCUMENTS

| | | | |
|---|---|---|---|
| 4,007,396 A | * | 2/1977 | Wisbey et al. .............. 313/500 |
| 5,105,186 A | | 4/1992 | May |

OTHER PUBLICATIONS

*Radio–Electronics*, "New Features in TV Sets", Mar. 1949 (4 pp).

Pamphlet, "Intelligent Personal–Care Environment", Apr. 2002, © 2002 Royal Philips Electronics (2 pp).

"Mobile Mirror", Today's Forethink, Jan. 2, 2003, retrieved from the Internet: http://www.zdnet.co.ip on Feb. 25, 2003 (2 pp).

Optics and Optical Instruments Catalog N977B, Edmund Scientific, 1997, cover and p. 79.

* cited by examiner

*Primary Examiner*—Vip Patel
(74) *Attorney, Agent, or Firm*—Fitch, Even, Tabin & Flannery

(57) ABSTRACT

An apparatus (10) having a switchable display/mirror (11) and a display driver (12). In one mode of operation the switchable display/mirror provides a visual display to a viewer (using, for example, an emissive array). In another mode of operation the switchable display/mirror provides a mirror-like reflection. In a preferred embodiment, the switchable display/mirror includes a transparent organic light emitting diode array (31) that operates in conjunction with a reflective electrode (32) and a switchable circular polarizer (23). In one embodiment the switchable circular polarizer (23) can be comprised of a switchable linear polarizer (34) and a quarter waveplate (36).

25 Claims, 2 Drawing Sheets

SWITCHABLE DISPLAY/MIRROR METHOD AND APPARATUS

TECHNICAL FIELD

This invention relates generally to displays.

BACKGROUND

Active displays of various kinds are well known in the art and include, for example, liquid crystal-based displays and various kinds of light emitting diode-based displays. Such displays are provided in a range of sizes, from relatively small to relatively large. Further, such displays are available to support presentation using any of a range of monochromatic colors and/or full color depictions. A wide range and ever-increasing number of mechanisms make use of one or more such displays, including two-way wireless communications devices (such as cellular telephones) and multimedia presentation devices of various kinds.

Generally speaking, such displays serve a useful purpose when powered into an active mode of operation. When quiescent, however, such displays typically simply present a blank uniform surface. Aside from some small amount of potential incidental reflection, prior art displays are substantially featureless and serve no supplemental purpose when powered down. This featureless expanse can potentially comprise a significant portion of the exterior surface area of the corresponding device.

BRIEF DESCRIPTION OF THE DRAWINGS

The above needs are at least partially met through provision of the switchable display/mirror method and apparatus described in the following detailed description, particularly when studied in conjunction with the drawings, wherein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are typically not depicted in order to facilitate a less obstructed view of these various embodiments of the present invention.

DETAILED DESCRIPTION

Generally speaking, pursuant to these various embodiments, a display can comprise an active array (such as an emissive array), a switchable polarizer, and a substantially reflective surface. During a first mode of operation, an observer views images as sourced by the active array while the switchable polarizer serves to prevent or limit incident reflections and glare. In a preferred embodiment, the reflective surface serves as a reflective electrode for the active array. During a second mode of operation, an observer perceives the display surface as a mirror when the polarizing facility of the switchable polarizer is switched off and incident light is reflected back towards the viewer by the reflective surface.

In one embodiment, the active array comprises an organic light emitting diode array and the substantially reflective surface is disposed rearwardly thereof.

An apparatus (such as but not limited to a handheld wireless communications device and/or a multimedia presentation apparatus) can have a display driver and a switchable display/mirror that is operably coupled to the display driver to permit a display mode of operation and a mirror mode of operation. So configured, the display surface (or a desired portion thereof) can serve as a mirror during quiescent modes of operation. This, in turn, can serve both utilitarian and decorative purposes as desired.

Figure 1:
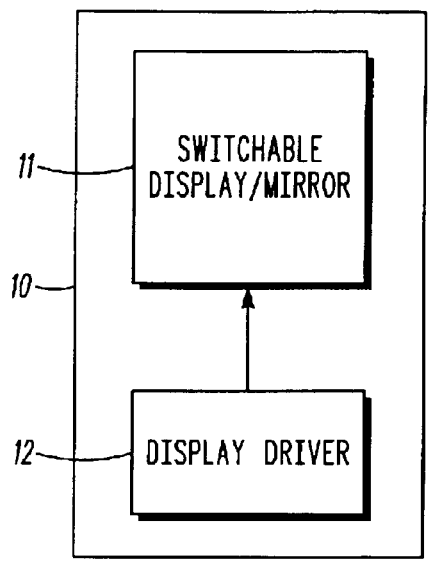
FIG. 1 comprises a block diagram as configured in accordance with an embodiment of the invention.

Referring now to the drawings, and in particular to FIG. 1, an apparatus 10 can be preferably comprised, at least in part, of a switchable display/mirror 11 that is operably coupled to a corresponding display driver 12. The apparatus 10 itself can comprise any stationary or mobile mechanism ordinarily having one or more displays. While handheld wireless communications devices (such as cellular telephones), multimedia presentation devices (including both audio, video, and audio/video platforms from small to large), and the like can benefit from such an approach, many other mechanisms can likely gain as well (including, for example, automotive rearview mirrors and the like). In a preferred approach, the switchable display/mirror comprises, at least in part, an organic light emitting diode-based display. Properly configured and pursuant to a preferred embodiment, the resultant display surface will be substantially transparent to visible light during at least some modes of operation including particularly a quiescent mode of operation. This, in turn, permits incident light to be reflected back through the display to facilitate provision of a mirror mode of operation.

Figure 2:
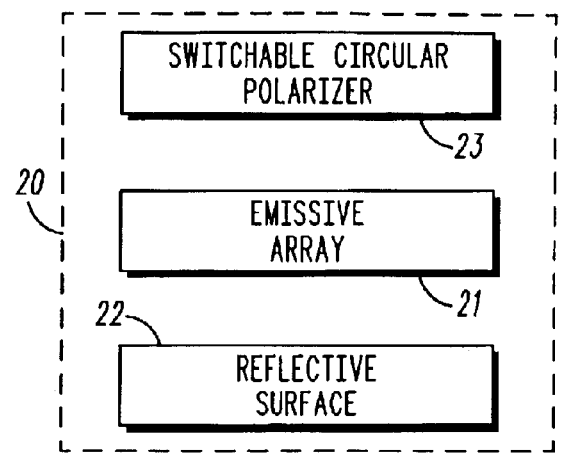
FIG. 2 comprises a block diagram as configured in accordance with an embodiment of the invention.

Referring now to FIG. 2, in one embodiment a switchable display/mirror 20 can be comprised of an emissive array 21 having a switchable circular polarizer 23 disposed forwardly thereof and a reflective surface 22 disposed rearwardly thereof. Again, in a preferred embodiment, the emissive array 21 can be comprised of a layer of organic light emitting diodes. The switchable circular polarizer 23 serves, in a preferred approach, to aid in preventing the reflection of incident ambient light while permitting the passage of light as sourced by the emissive array 21.

The switchable circular polarizer 23 also serves, in a preferred approach, as a substantially transparent layer during at least one switchably selectable mode of operation (including, preferably, during a quiescent mode of operation for the display itself). When substantially transparent, the switchable circular polarizer 23 will permit ambient light to pass from the front through to the reflective surface 22 and will further permit reflected light to pass from the reflective surface 22 and back therethrough.

The reflective surface 22 should preferably reflect at least fifty percent of incident visible light to better effect a mirror mode of operation for the switchable display/mirror 20. Higher degrees of reflectively are of course preferred with a mirror-like finish being desired. Further, and again to better effect a mirror mode of operation, at least substantial portions of the reflective surface 22 are substantially planar. In one embodiment, an aluminum finish can serve to realize such a reflective surface 22. The reflective surface 22 can be formed and disposed apart from the emissive array 21 or can be formed integral thereto as desired and/or suggested by the needs of a particular application.

Figure 3:
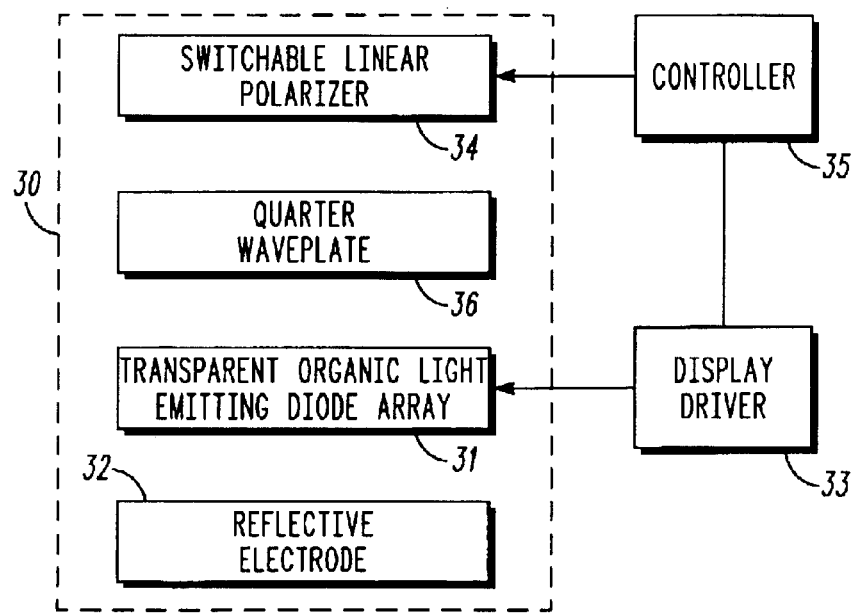
FIG. 3 comprises a block diagram as configured in accordance with another embodiment of the invention, FIG. 4 comprises a side elevational schematic view that illustrates a first mode of operation as configured in accordance with an embodiment of the invention.

Referring now to FIG. 3, and pursuant to one embodiment, a switchable display/mirror 30 can be comprised of a transparent organic light emitting diode array 31 that is backed with an aluminum reflective electrode 32. So configured, light can pass through the light emitting diode array 31 due to its transparency and be at least substantially reflected back from the reflective electrode 32. A display driver 33 drives and controls the displaying functionality of the light emitting diode array 31 in accordance with well understood prior art technique.

In this embodiment, the switchable display/mirror 30 also includes a switchable circular polarizer comprised of a switchable linear polarizer 34 and a quarter waveplate 36. The polarizer is controlled by a controller 35 such that in one mode of operation the polarizer permits light that is polarized parallel to the polarizer's transmission axis to pass therethrough. In another mode of operation, the polarizer will permit light from essentially any polarization angle to pass therethrough. In effect, the controller 35 comprises a switchable circular polarizer actuator that can cause the polarizer to be switched into a substantially absorptive polarizing active state of operation.

Figure 4:
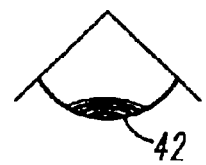
Figure 4:
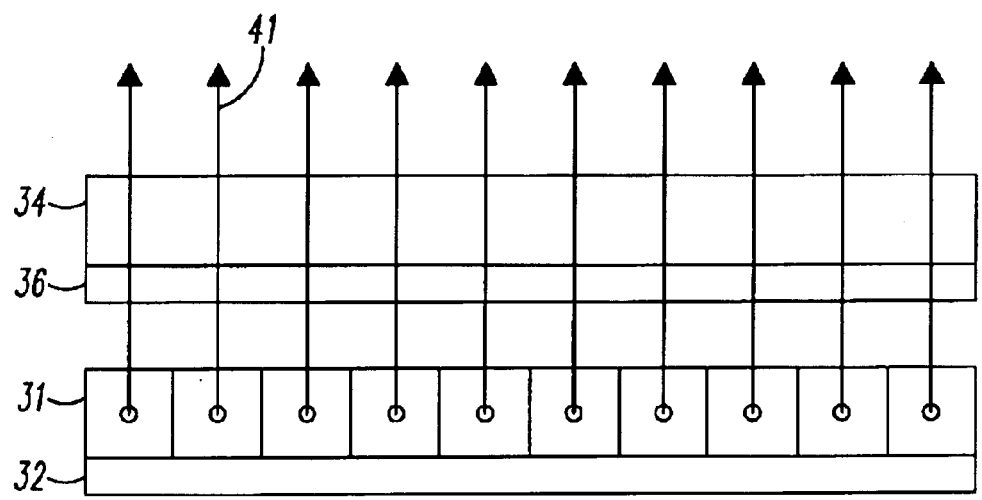
Figure 5:
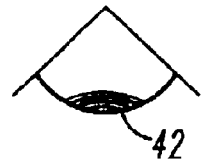
FIG. 5 comprises a side elevation schematic view that illustrates a second mode of operation as configured in accordance with an embodiment of the invention.
Figure 5:
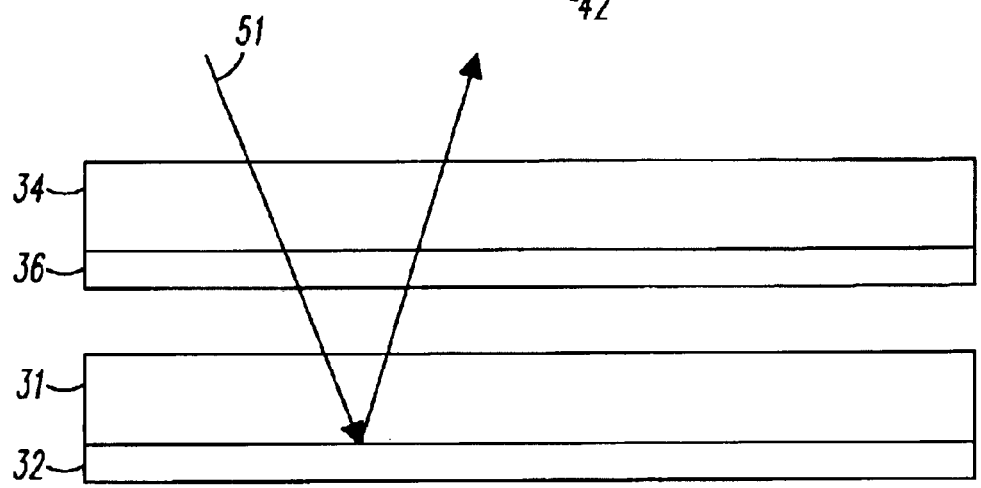

The above-described functionality may be more readily understood with reference to FIGS. 4 and 5. FIG. 4 illustrates the display mode of operation for the switchable display/mirror. In this mode, a display driver 33 causes the light emitting elements of the transparent organic light emitting diode array 31 to be selectively driven in accordance with well understood prior art technique. A significant and useful amount of the light 41 from the light emitting diode array 31 will pass through the polarizer 34 such that a viewer 42 can readily perceive the corresponding visual display. At the same time, ambient light that strikes the switchable linear polarizer 34 will be effectively absorbed at the polarizer after reflection from the rear electrode, thereby avoiding glare and/or otherwise impairing a proper viewing of the intended display.

When the surface area is no longer needed as an emissive-based display, the display driver can bring the transparent organic light emitting diode display 31 to a quiescent state as shown in FIG. 5. In this mode, the display 31 is essentially transparent to light and does not itself emit any self-sourced light. At the same time, a controller can be used to switch the linear polarizer 34 into a non-polarizing mode of operation, such that ambient light 51 will pass through the switchable linear polarizer 34, the quarter waveplate 36, and the transparent organic light emitting diode arrray 3 land be reflected off of the reflective electrode 32 and back through these same layers in reverse. When this occurs, the viewer 42 will see reflected ambient light. So configured, in this mode of operation, the overall display functions as a mirror.

Providing a selectable display/mirror serves a valuable and desirable purpose for many users and applications. When used with a small handheld device, such as a cellular telephone, the mirror mode can be used to serve as a small personal mirror for personal grooming needs and the like. When used with larger devices, such as a wall-mounted television screen, the mirror mode can be used to permit the television screen to serve as a decorative wall mirror during periods of non-use. These benefits are attained with only a relatively small incremental cost as compared to a similarly configured display that lacks the mirror capability.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A display comprising:
   an emissive array,
   a switchable circular polarizer disposed forwardly of the emissive array;
   a substantially reflective surface disposed rearwardly of the switchable circular polarizer.

2. The display of claim 1 wherein the emissive array comprises an array of organic light emitting diodes.

3. The display of claim 1 wherein the emissive array is substantially transparent to visible light during at least a quiescent mode of operation.

4. The display of claim 3 wherein the reflective surface is disposed rearwardly of the emissive array.

5. The display of claim 1 wherein the substantially reflective surface is disposed rearwardly of the emissive array.

6. The display of claim 1 wherein the substantially reflective surface reflects at least fifty percent of incident visible light.

7. The display of claim 1 wherein at least a portion of the substantially reflective surface is substantially planar.

8. The display of claim 1 wherein at least a portion of the substantially reflective surface is mirror-like.

9. The display of claim 1 wherein at least a portion of the substantially reflective surface comprises aluminum.

10. The display of claim 1 wherein the substantially reflective surface comprises a reflective electrode for the emissive array.

11. The display of claim 1 wherein the switchable circular polarizer comprises:
    a switchable linear polarizer; and
    a quarter waveplate.

12. The display of claim 1 wherein the switchable circular polarizer has a substantially transparent quiescent state of operation.

13. The display of claim 12 and further comprising a switchable circular polarizer actuator that is operably coupled to the switchable circular polarizer, such that the switchable circular polarizer can be switched into a substantially absorptive polarizing active state of operation.

14. An apparatus comprising:
    a display driver;
    a switchable display/mirror that is operably coupled to the display driver and having a display mode of operation and a mirror mode of operation, comprising:
       an active array;
       a substantially reflective substantially planar surface disposed rearwardly of the active array.

15. The apparatus of claim 14 wherein the active array comprises an organic light emitting diode array.

16. The apparatus of claim 15 wherein the organic light emitting diode array is substantially transparent to visible light during at least some modes of operation.

17. The apparatus of claim 16 wherein the organic light emitting diode array is substantially transparent to visible light during a quiescent mode of operation.

18. The apparatus of claim 15 wherein the substantially reflective substantially planar surface comprises a reflective electrode for the organic light emitting diode array.

19. The apparatus of claim 14 wherein the switchable display/mirror further comprises a switchable circular polarizer disposed forwardly of the active array.

20. The apparatus of claim 19 wherein the switchable circular polarizer comprises:

a switchable linear polarizer; and a quarter waveplate.

21. The apparatus of claim 14 wherein the apparatus comprises a handheld wireless communications device.

22. The apparatus of claim 14 wherein the apparatus comprises a multimedia presentation apparatus.

23. A method comprising:

providing an emissive array;

providing a switchable circular polarizer forwardly of the emissive array;

providing a substantially reflective surface rearwardly of the switchable circular polarizer.

24. The method of claim 23 wherein providing a substantially reflective surface rearwardly of the switchable circular polarizer includes disposing the substantially reflective surface rearwardly of the emissive array.

25. The method of claim 24 wherein providing an emissive array includes providing an organic light emitting diode array that is substantially transparent to light when in a quiescent mode of operation.

* * * * *